(12) United States Patent
Feser

(10) Patent No.: US 6,874,836 B1
(45) Date of Patent: Apr. 5, 2005

(54) COVERED TRASH RECEPTACLE

(76) Inventor: David C. Feser, 4707 Winding Creek Ct., Flowery Branch, GA (US) 30542

( * ) Notice: Subject to any disclaimer, the term of this patent is extended or adjusted under 35 U.S.C. 154(b) by 0 days.

(21) Appl. No.: 10/417,448

(22) Filed: Apr. 16, 2003

(51) Int. Cl.[7] .................................................. B60R 7/02
(52) U.S. Cl. ..................... 296/37.8; 296/37.1; 224/274; 224/483; 224/928; 220/839
(58) Field of Search ............. 296/37.1, 37.8; 220/506, 220/839, 908, 737; 224/483, 928, 274

(56) References Cited

U.S. PATENT DOCUMENTS

| | | | |
|---|---|---|---|
| 2,201,333 A | * | 5/1940 | Carlson ...................... 296/37.9 |
| 2,545,320 A | | 3/1951 | Tilson et al. |
| 2,683,579 A | | 7/1954 | Wallace |
| D180,199 S | * | 4/1957 | Perreault ...................... D34/8 |
| 2,922,515 A | * | 1/1960 | Barnes ........................ 224/543 |
| 3,272,466 A | | 9/1966 | Sherman |
| 3,310,266 A | | 3/1967 | Larkin et al. |
| 3,471,114 A | | 10/1969 | Ball |
| 3,504,830 A | * | 4/1970 | Trammell, Jr. ............... 224/275 |
| 3,679,161 A | | 7/1972 | Husting |
| 4,522,442 A | * | 6/1985 | Takenaka .................... 296/37.1 |
| 4,905,945 A | | 3/1990 | Peterson |
| 4,930,653 A | | 6/1990 | Machado |
| 4,989,767 A | * | 2/1991 | Buschbom ................... 224/274 |
| 5,285,996 A | | 2/1994 | Waller |
| 5,551,616 A | | 9/1996 | Stitt et al. |
| 5,687,895 A | * | 11/1997 | Allison et al. .............. 224/542 |
| 5,758,888 A | | 6/1998 | Burgan et al. |
| D402,560 S | | 12/1998 | Fogle |
| 5,881,990 A | | 3/1999 | Kawamura |
| 5,951,085 A | * | 9/1999 | Fukatsu ...................... 296/37.8 |
| 6,183,029 B1 | * | 2/2001 | Deaton ....................... 296/37.1 |
| 6,425,562 B1 | | 7/2002 | Knudson |
| 6,582,002 B2 | * | 6/2003 | Hogan et al. ............. 296/37.12 |
| 6,641,192 B2 | * | 11/2003 | Eschenfelder .............. 296/37.1 |
| 2002/0008397 A1 | * | 1/2002 | Takahashi .................. 296/37.1 |

* cited by examiner

*Primary Examiner*—Stephen Gordon
(74) *Attorney, Agent, or Firm*—Hinkle + O'Bradovich, LLC

(57) ABSTRACT

A covered trash receptacle system for vehicles such as golf carts is described. The system typically includes a trash receptacle main body having a hollow interior into which trash can be placed. The main body includes a lid connected to the main body with a hinge system that prevents the lid from opening past a certain point so that the system can be operated and emptied with one hand. The main body sits within a cradle that is fixed to the floor board of the vehicle. The main body can be easily placed into and taken out of the cradle as needed.

8 Claims, 3 Drawing Sheets

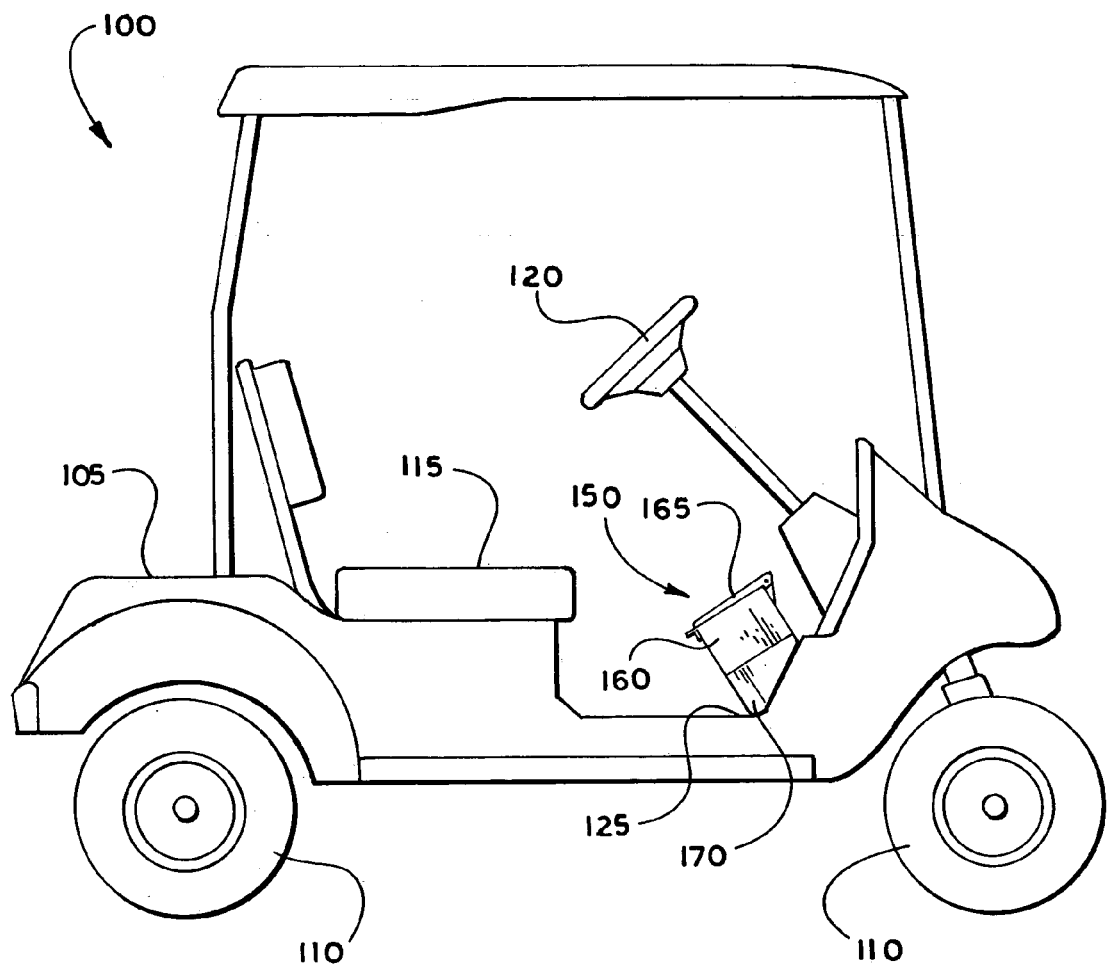
Fig_1

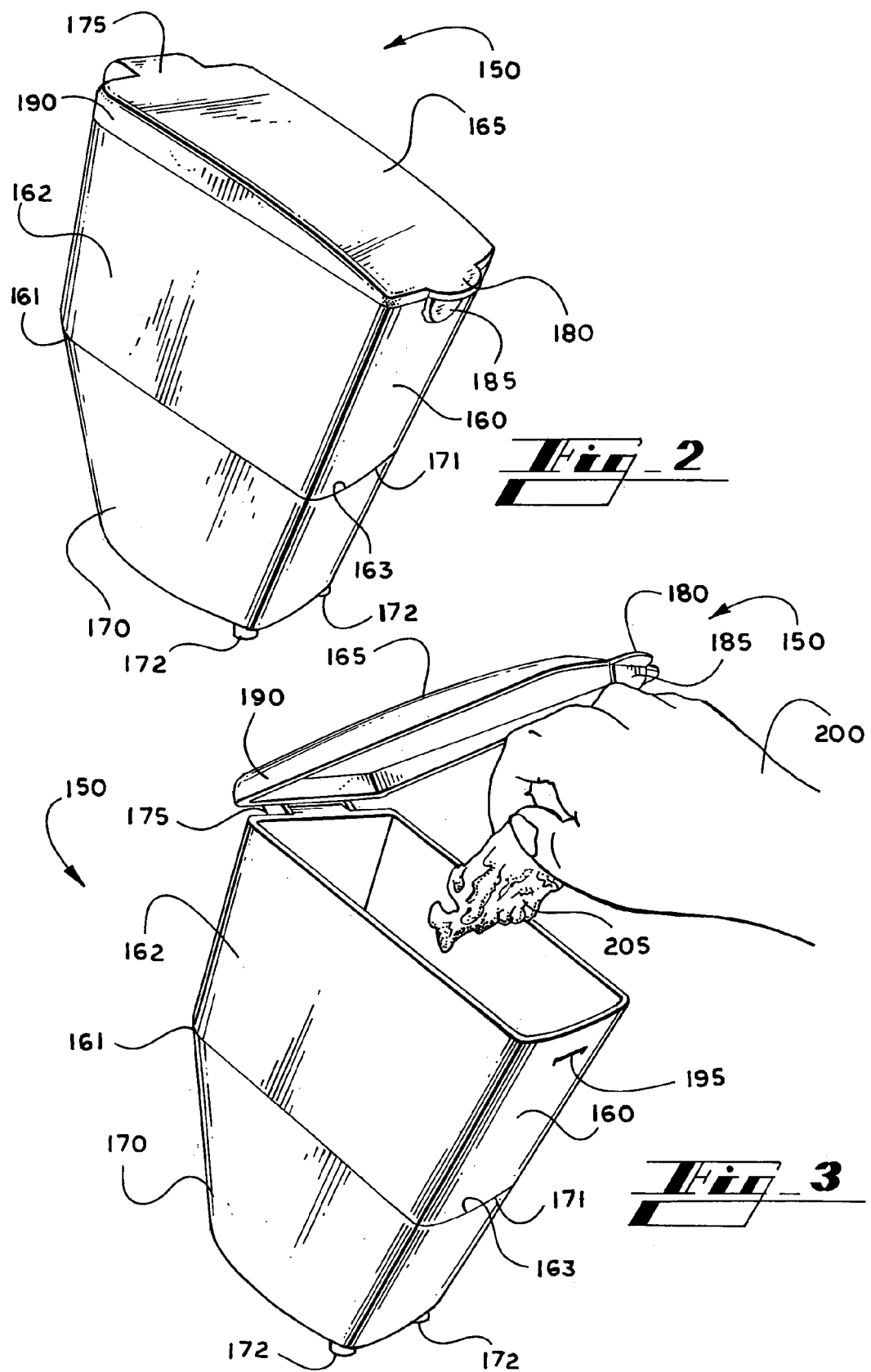

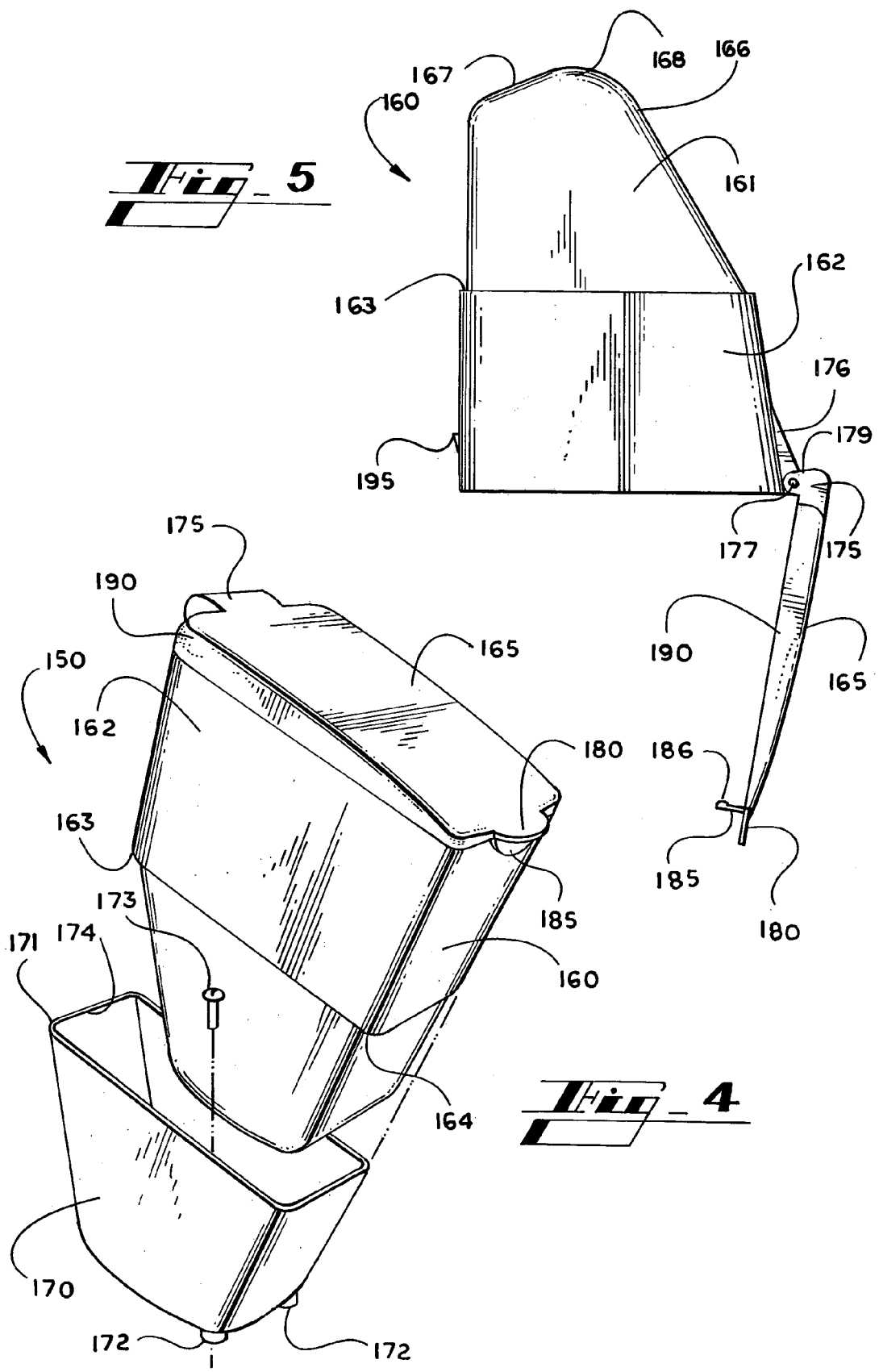

COVERED TRASH RECEPTACLE

BACKGROUND OF THE INVENTION

I. Field of the Invention

The present invention relates generally to the field of trash disposal and more particularly to an apparatus and system for trash disposal in vehicles.

II. Description of the Related Art

In vehicles of all kinds trash disposal can be difficult. Often times trash can gather in the vehicle and become a nuisance or even a hazard. In recreational vehicles such as golf carts, where space is limited, trash can become a particular nuisance. Since a typical golf cart is open to the environment, any gathered trash can fly out of the cart littering the golf course. To exacerbate the problem, often times the golf course lawn mowers mow over the trash tearing the trash apart to several smaller pieces making it more difficult to clean. This situation can cause inconvenience and a possibly hazardous condition to other golfers.

SUMMARY

In general, the invention features a covered trash receptacle apparatus and system. The system typically includes a trash receptacle main body having a hollow interior into which trash can be placed. The main body includes a lid connected to the main body with a hinge system that prevents the lid from opening past a certain point so that the system can be operated and emptied with one hand. The main body sits within a cradle that is fixed to the floor board of the vehicle. The main body can be easily placed into and taken out of the cradle as needed.

In general, in one aspect, the invention features a vehicle trash receptacle system, including a main body having a hinged lid and a cradle having an interconnection system, the main body being held within the cradle.

In one implementation, the system further includes a handle-tab connected to and generally parallel with a front-most portion of the lid and a latch-tab connected to and generally perpendicular to the front most portion of the lid.

In another implementation, the system includes a protrusion connected generally perpendicular to the latch-tab and a latch-recess located on a portion of the main body and interconnected with the protrusion when the lid is in a closed position.

In another implementation, the system includes a stop-tab connected to a rear most portion of the lid.

In another implementation, the main body comprises an upper portion, lower portion and an edge defined between the upper and lower portions, the edge being in contact with an edge on the cradle when the main body is fit within the cradle.

In another implementation, the lower portion of the main body is held within the cradle.

In another implementation, the lower portion is contoured.

In another implementation, the system includes one or more connection points located on the cradle.

In another aspect, the invention features a vehicle system, including a vehicle, a trash receptacle cradle connected to the vehicle, a trash receptacle connected to the trash receptacle cradle and a lid hingably connected to the trash receptacle.

In one implementation, the system includes a handle-tab connected to and generally parallel with a front-most portion of the lid and a latch-tab connected to and generally perpendicular to the front most portion of the lid.

In another implementation, the system includes a protrusion connected generally perpendicular to the latch-tab and a latch-recess located on a portion of the main body and interconnected with the protrusion when the lid is in a closed position.

In another implementation, the lid is connected to the body by a hinge system.

In another implementation, the hinge system comprises a stop-tab adapted to prevent the lid from opening past a certain point.

In still another aspect, the invention features a golf cart trash receptacle system, including a golf cart, a trash receptacle cradle connected to the golf cart, a trash receptacle connected to the trash receptacle cradle and a lid hingably connected to the trash receptacle.

In yet another aspect, the invention features a trash receptacle system, including a main trash receptacle cradle having a hinged lid, a trash receptacle held within the trash receptacle cradle and means to connect the main trash receptacle cradle to a vehicle.

In another aspect, the invention features a trash receptacle kit, including a trash receptacle cradle adapted to be connected to the floor board of a vehicle, a trash receptacle adapted to be placed within the interior of the cradle and means adapted to connect the trash receptacle cradle to the floor board.

In one implementation, the means adapted to connect the trash receptacle cradle to the floor board is one or more screws.

One advantage of the invention is that gathered trash in a vehicle can be located in to a single secured location so that the trash does not blow out of the vehicle.

Another advantage of invention is that it includes a removable main body so that the main body can be removed from the vehicle to dispose of the gathered trash.

Another advantage of the invention is that it typically can be operated with one hand.

Other objects, advantages and capabilities of the invention will become apparent from the following description taken in conjunction with the accompanying drawings showing the preferred embodiment of the invention.

BRIEF DESCRIPTION OF THE DRAWINGS

FIG. 1 illustrates a typical golf cart including an embodiment of a covered trash receptacle system;

FIG. 2 illustrates a perspective view of an embodiment of a covered trash receptacle system in an upright and closed position;

FIG. 3 illustrates a perspective view of an embodiment of a covered trash receptacle system in an upright and open position;

FIG. 4 illustrates a perspective view of the constituent components of a covered trash receptacle system; and FIG. 5 illustrates a side view of an embodiment of a covered trash receptacle in an inverted and open position.

DETAILED DESCRIPTION

Referring to the drawings wherein like reference numerals designate corresponding parts throughout the several figures, reference is made first to FIG. 1 that illustrates a typical golf cart 100 including an embodiment of a covered trash receptacle system 150. The golf cart 100 and the covered trash receptacle system 150 are used in conjunction as a golf cart system. The golf cart 100 typically includes a main body 105, wheels 110, a seat 115, a steering wheel 120 and a floor board 125. The trash receptacle system 150 typically includes a trash receptacle body 160 having a lid 165 and a trash receptacle cradle 170, which is typically connected to the floor board 125 as described further below. The floor board 125 of a vehicle such as the golf cart 100 is typically angled at the location having the throttle and brake pedals. The generally tapered shape of the cradle 170 as described further below allows a natural fit of the cradle 170 into the angled contour of the floor board 125. The trash receptacle body 160 is held within the cradle 170. The trash receptacle system 150 is typically connected at an angle with respect to the floor board 125 allowing easier access to users of the golf cart 100. Additional features and components of the trash receptacle system 150 are discussed in further detail in the description below.

FIG. 1 illustrates the use of the system 150 in a golf cart. It is understood that the system 150 can be used in any type of vehicle.

FIG. 2 illustrates a perspective view of an embodiment of a covered trash receptacle system 150 in an upright and closed position. As mentioned above with respect to FIG. 1, the covered trash receptacle system 150 includes a trash receptacle body 160 having a lid 165 and a cradle 170. The lid 165 is hingeably connected to the body 160 by a hinge system 175. The lid 165 further includes a handle-tab 180 connected to the front-most portion of and generally parallel to the lid 165. A latch-tab 185 is also connected to the front most portion of and generally perpendicular to the lid 165. The latch-tab 185 is also generally perpendicular to the handle-tab 180. As discussed further in the description below, the latch-tab 185 interconnects with a portion of the body 160 to lock the lid 165 to the body 160. The lid 165 further includes a lip 190 connected along the perimeter of the lid 165. The lip 190 generally overhangs a portion of the body 160 when the lid 165 is in the closed position. The lip 190 generally varies in width along the perimeter with the narrowest width being located at the front-most portion of the lid 165 proximate the handle-tab 180 and the latch tab 185.

The body 160 is generally separated into a lower portion 161, which is located within the cradle 170 and an upper portion 162, which is located above the cradle 170. The outer surface of the upper portion 162 is generally flush with the outer surface of the cradle 170. An edge 163 between the upper and lower portions 161, 162 generally rests on an upper edge 171 of the cradle 170, thereby creating a snug fit between the body 160 and the cradle 170. The upper portion 162 is generally rectangular and the lower portion 161 is partially tapered, the lower most portion of the lower portion 161 being generally smaller than the upper portion 162, thereby allowing a desirable interconnection between the body 160 and the cradle 170. The interconnection of the body 160 and the cradle 170 is discussed in further detail in the description below. The body 160 can include many additional features such as air holes in order to equalize pressure when the lid 165 is closed. The body 160 can further include drainage holes so that liquid can flow out of the body 160.

The cradle 170 can further include one or more, but typically a plurality of connection points 172. The connection points 172 are typically holes adapted to receive screws or other connection devices so that the cradle can be connected to the floor board 125 of the respective vehicle. The connection points 172 can also be cylindrical protrusions containing holes for screws or other connection devices. The cylindrical protrusion form helps to steady the cradle when it is attached to the floor board 125. As mentioned briefly above, the tapered shape of the lower portion 161 and the cradle 170 help in allowing a good fit between the floor board 125 of a typical vehicle and the cradle 170, thereby enabling an angled connection of the trash receptacle system 150 that is natural to the reach of a user.

FIG. 3 illustrates a perspective view of an embodiment of a covered trash receptacle system 150 in an upright and open position. A user 200 is shown placing trash 205 into the body 160. As described above, the lid 165 is hingeably connected to the body 160 by hinge system 175. Typically, the lid 165 rotates about the hinge system 175 when the trash 205 receptacle system 150 is put into its open and closed positions. When the lid 165 is open, the opening and the hollow interior of the body 160 is exposed. Trash 205 is placed into the hollow interior as needed. As described above, the lip 190 on the lid 165 overlaps a portion of the body 160 when the lid 165 is closed. This overlap helps to keep trash 205 within the hollow interior of the body 160.

In typical use, the user 200 engaged the handle tab 180 and applies an upward force to rotate the lid 165 about the hinge system 175 in order to expose the interior of the body 160. As mentioned above, the latch-tab 185 interconnects with a portion of the body 160 to lock the lid 165 to the body 160. In order to lock the lid 165 to the body 160 a small protrusion (not shown in FIG. 3, see FIG. 5 protrusion 186) connected generally perpendicular to the latch-tab 185 engages with a latch-recess 195. In a typical implementation, the system 150 is manufactured from a resilient and flexible material such as plastic. The latch-tab 185 (as well as the protrusion 186) and the latch-recess 195 typically remained fixed, but can slightly deform as the pass each other and spring back into there natural fixed state after they pass by each other. The resilient nature of the materials used in the system 150 allow the latch-tab 185 and the latch-recess 195 to be a locking mechanism for the system 150.

FIG. 4 illustrates a perspective view of the constituent components of a covered trash receptacle system 150. As described above, the basic constituent components of the system 150 are the body 160 having a lid 165 and the cradle 170. The body 160 is shown in a position above the opening of the cradle 170 as the body 160 is being placed into and out of the cradle 170. As described above, the lower portion 161 of the body 160 is placed and held within the cradle 170. The edge 163 defined between the upper and lower portions 162, 161 is adapted to be flush with the perimeter edge 171 of the cradle to create a snug fit between the body 160 and the cradle 170.

In another embodiment, the edge 171 of the cradle 170 can include a ridge 174 and the body 160 can include a recess 164 adapted to receive the ridge 174 so that the body 160 can fit more snugly into the cradle 170. The resilient nature of the material used to make the system 150 allows the ridge 174 and the recess 164 to slightly deform when the body 160 is pulled from the cradle 170.

In order to connect the cradle 170 to the floor board 125 of the vehicle, screws 173 or other suitable attachment mechanisms can be placed through the connection points 172 and ultimately into the floor board. The body 160, the cradle 170 and any suitable attachment mechanism such as screws 173 can be packaged together as a trash receptacle kit.

FIG. 5 illustrates a side view of an embodiment of a covered trash receptacle body 160 in an inverted and open position. The side view illustrates the separation between the upper and lower portions 162, 161 of the body as well as the edge 163 between the upper and lower portions 162, 161. Furthermore, the protrusion 186 on the latch-tab 185 is shown. As described above, the protrusion 186 is adapted to interconnect with the latch-recess 195 on the body 160 when the lid 165 is closed. The side view also shows further details of the hinge system 175. The hinge system 175 can include truss supports 176 connected to the body 160 to add support for the hinge system 175. The hinge system 175 can further include pivot points 177 about which the lid 165 rotates. The hinge system 175 further includes a stop-tab 179 that is adapted to come into contact with the truss supports 176. The stop-tab 179 thereby prevents the lid 165 from opening past a certain point. By positioning the lid 165 in this way, the lid typically always falls back into a closed position when the user releases the lid 165 because a gravitational torque is allowed to act on the lid 165.

FIG. 5 further illustrates the shape and contour of the body 160. As discussed above, the lower portion 161 is generally tapered. A rear tapered edge 166 generally conforms to the tapered shape of the cradle and allows a natural fit to the curve of the floor board 125. A lower tapered edge 167 can also be included on the lower portion 161 to conform to the shape of the cradle 170 and to create a lower-most portion 168 of the body 160 into which trash 205 can migrate.

During use of the system 150, the cradle 170 is connected to the floorboard 125. The body 160 generally is fit within the cradle 160. The cradle 170 is intended to remain as a fixture on the floor board 125 and the body is intended to be removable. The lid 165 is intended to be opened and closed as needed to insert trash 205 into the interior of the body 160. As described above, the user 200 can engage the handle-tab 180 in order to apply a force to open the lid 165. By applying the force, the protrusion 186 moves past the latch-recess 195 thereby unlocking the lid 165 from the body 160. When the user is done placing trash 205 into the body 165, the user can manually re-latch the protrusion 186 on the latch-recess 195. However, since the system 150 is typically connected to the floor board 125 at an angle and because the stop-tab 179 does not allow the lid 165 to be opened past a certain point, the user can simply release the handle-tab 180. When the handle-tab 180 is released, the force of gravity pulls on the lid 165. This force is typically enough to allow the protrusion 186 to move past the latch-recess 195 and re-latch the protrusion 186 and the latch-recess 195 into a locked position. Therefore, the angled connection of the system 150 not only conforms to the natural angle of the floor board but also conforms to the natural movements and habits of a user. During normal use of the system 150, the body 160 can become full with trash 205. The user 200 can therefore remove the body 160 from the fixed cradle 170. When the user inverts the body 160 as shown in FIG. 5, the trash 205 can be easily dumped out of the body 160. In a typical implementation, the user 200 can engage the handle-tab 180 as described above to open the lid 165. In another implementation, the trash 205 may provide enough weight to disengage the protrusion 186 from the latch-recess 195 so that the lid 165 opens simply from the gravitational force on the lid 165 and the trash 205. In still another implementation, the user 200 can simply invert the body as shown and provide a strong "jerk" that can thrust the trash 205 against the lid 165 thereby disengaging the protrusion 186 from the latch-recess 195, thereby allowing the trash 205 to fall from the interior of the body 160. It is understood that there are a variety of additional ways that the trash 205 can be removed from the body 160. When the body 160 is re-inverted to the upright position, the lid 160 may naturally fall back into a closed position because the stop-tab 179 keeps the lid 165 from opening past a certain point. The user can also manually close the lid 165. The body 160 can subsequently be re-positioned within the cradle 170 after the trash 205 is removed.

The foregoing is considered as illustrative only of the principles of the invention. Further, various modifications may be made of the invention without departing from the scope thereof and it is desired, therefore, that only such limitations shall be placed thereon as are imposed by the prior art and which are set forth in the appended claims.

What is claimed is:

1. A vehicle trash receptacle system, comprising:
   a trash receptacle body having a hollow interior to receive trash therein and having a hinged lid, the body being defined by an upper portion having an outer surface and a lower tapered portion, the upper and lower portions being separated by an edge surrounding the entire perimeter of the body; and
   a cradle having an interconnection system, an outer surface and an upper edge surrounding the entire perimeter of the cradle and defining an opening into the interior of the cradle, the lower portion of the main body being held within the cradle in a mated arrangement and being enclosed by the cradle, such that the edge between the upper and lower portions rests on the upper edge of the cradle and such that the outer surface of the upper portion and the outer surface of the cradle are flush.

2. The system as claimed in claim 1 further comprising:
   a handle-tab connected to and generally parallel with a front-most portion of the lid; and
   a latch-tab connected to and generally perpendicular to the front most portion of the lid.

3. The system as claimed in claim 2 further comprising:
   a protrusion connected generally perpendicular to the latch-tab; and
   a latch-recess located on a portion of the body and interconnected with the protrusion when the lid is in a closed position.

4. The system as claimed in claim 1 further comprising a stop-tab connected to a rear most portion of the lid.

5. The system as claimed in claim 1 further comprising one or more connection points located on the cradle.

6. The system as claimed in claim 4 further comprising truss supports located on the rear of the body adjacent the stop tab.

7. The system as claimed in claim 6 wherein the lid is hingably connected to the truss supports.

8. The system as claimed in claim 1 further comprising a lower tapered edge being defined on the lower tapered portion.

* * * * *